Patented Dec. 25, 1951

2,579,933

UNITED STATES PATENT OFFICE 2,579,933

SOLUBLE SALTS OF SULFONAMIDES

Heinrich Koster, Milan, and Giampiero Gennari, Santa Maria Maggiore, Italy, assignors to Carlo Erba S. p. A., Milan, Italy, a firm No Drawing. Application September 5, 1950, Serial No. 183,296

1 Claim. (Cl. 260—239.65)

This invention relates to the production of soluble salts of sulfonamides and to injectible solutions containing the same.

The sulfonamides, as weak acids, give salts with strong bases, such as sodium hydroxide, that in aqueous solution are hydrolysed giving a strongly alkaline reaction of high pH. We have found that the inconvenience and poor tolerance of such solutions of high pH can be avoided by the use of salts of low alkalinity in aqueous solution.

We have found that salts of sulfonamides, particularly the pyrimidinic sulfonamides such as, sulfadiazine (2-sulfanilamidopyrimidine), sulfamerazine (2-sulfanilamido-4-methylpyrimidine), and sulfamethazine (2-sulfanilamido-4,6-dimethylpyrimidine), with 1-amino-2,3-propanediol are stable, well tolerated in the body and give colorless aqueous solutions having a pH of the order of 8.5 to 8.7. The solutions of the salts may be made by dissolving in water approximately equimolecular proportions of the sulfonamide and the aminoglycerol preferably not exceeding a 10% molar excess of the aminoglycerol in amounts to give a solution of the desired concentration. The solutions are stable even above 100° C., so that a normal sterilization is practicable without alteration of the properties or color of the solution.

Example

Substantial equimolecular proportions of sulfadiazine and 1-amino-2,3-propanediol are dissolved in water in an amount to give a 20% solution of the salt. The solution thus obtained has a pH of 8.7, is colorless and is well tolerated, being injectible intramuscularly and intravenously.

It is possible to prepare aqueous solutions of the salts of aminoglycerol with the pyrimidinic sulfonilamides in concentrations greater than 20%, which are particularly useful in veterinary practice.

We claim:

1-amino-2,3-propanediol salts of pyrimidine sulfonamides of the group consisting of 2-sulfanilamidopyrimidine, 2-sulfanilamido-4-methylpyrimidine, and 2-sulfanilamido-4,6-dimethylpyrimidine, characterized by forming injectible aqueous solutions having a pH of about 8.5 to 8.7 sterilizable by heat without change.

HEINRICH KOSTER.
GIAMPIERO GENNARI.

REFERENCES CITED

The following references are of record in the file of this patent:

UNITED STATES PATENTS

| Number | Name | Date |
|---|---|---|
| 2,503,820 | Gysin | Apr. 11, 1950 |